United States Patent [19]

Poldervaart et al.

[11] E Patent Number: Re. 32,578

[45] Reissued Date of Patent: Jan. 12, 1988

[54] MOORING SYSTEM

[75] Inventors: Leendert Poldervaart, La Turbie, France; Anton Coppens, Oegstgeest, Netherlands

[73] Assignee: Single Buoy Moorings Inc., Fribourg, Switzerland

[21] Appl. No.: 737,404

[22] Filed: May 24, 1985 (Under 37 CFR 1.47)

Related U.S. Patent Documents

Reissue of:

[64] Patent No.: 4,490,121
Issued: Dec. 25, 1984
Appl. No.: 352,080
Filed: Feb. 25, 1982

[30] Foreign Application Priority Data

Feb. 26, 1981 [NL] Netherlands ..... 8100936

[51] Int. Cl.[4] ..... B63B 22/02
[52] U.S. Cl. ..... 441/5; 114/230
[58] Field of Search ..... 114/230, 249, 264; 441/3-5; 141/382-388; 244/115, 161

[56] References Cited

U.S. PATENT DOCUMENTS

| | | | |
|---|---|---|---|
| 3,572,408 | 3/1971 | Hnot | 114/230 |
| 3,595,278 | 7/1971 | Lilly et al. | 141/1 |
| 3,823,432 | 7/1974 | Van Heijst | 441/3 |
| 4,119,051 | 10/1978 | Orndorff | 114/249 |
| 4,281,611 | 8/1981 | Vilain | 114/230 |
| 4,359,959 | 11/1982 | Delamare | 114/230 |

FOREIGN PATENT DOCUMENTS

| | | | |
|---|---|---|---|
| 2752266 | 5/1979 | Fed. Rep. of Germany | 114/230 |
| 2381166 | 9/1978 | France | 141/387 |
| 2414439 | 8/1979 | France | 141/387 |
| 7704364 | 10/1977 | Netherlands | 141/387 |
| 7805043 | 12/1978 | Netherlands | 114/230 |
| 7802200 | 8/1979 | Netherlands | 114/230 |
| 7901416 | 9/1979 | Netherlands | 441/4 |
| 2046199 | 11/1980 | United Kingdom | 141/387 |
| 2050995 | 1/1981 | United Kingdom | 141/387 |

*Primary Examiner*—Joseph F. Peters, Jr.
*Assistant Examiner*—Jesûs D. Sotelo
*Attorney, Agent, or Firm*—Young & Thompson

[57] ABSTRACT

The invention relates to a mooring system, comprising a tanker (1,9,15,22,72,86,104,131) and a device (5,11,20,61,74,95,111,135) having some type of anchor (3,10,23,66,71,68,77,113,140), the tanker being rotatably connected with that device for rotation about a vertical axis (4,117). A conduit (6,24,25,45,46,122-125) extends upwardly towards that device (5,11,20,61,74,95,111,135) and towards a swivel (38,58,79,102,121) concentric with that axis (4,117) and from the swivel towards the tanker, the system having a quick connect coupling (83,84,85,91,92,97,116,117,118). The device (5, etc.) preferably has controllable buoyancy and can be of any type including a normal mooring buoy.

16 Claims, 17 Drawing Figures

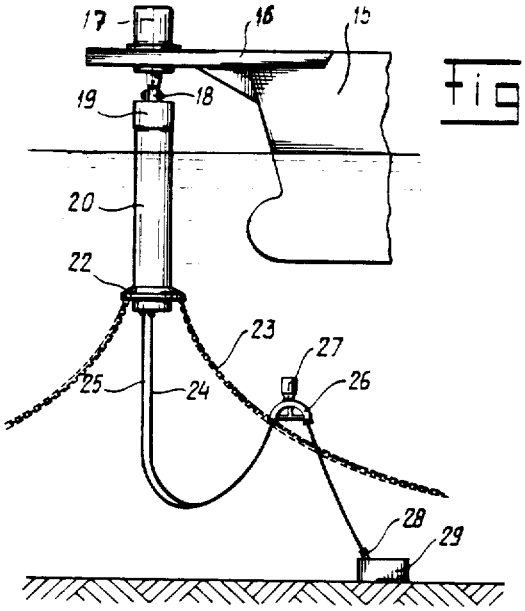
Fig-4
Fig-5
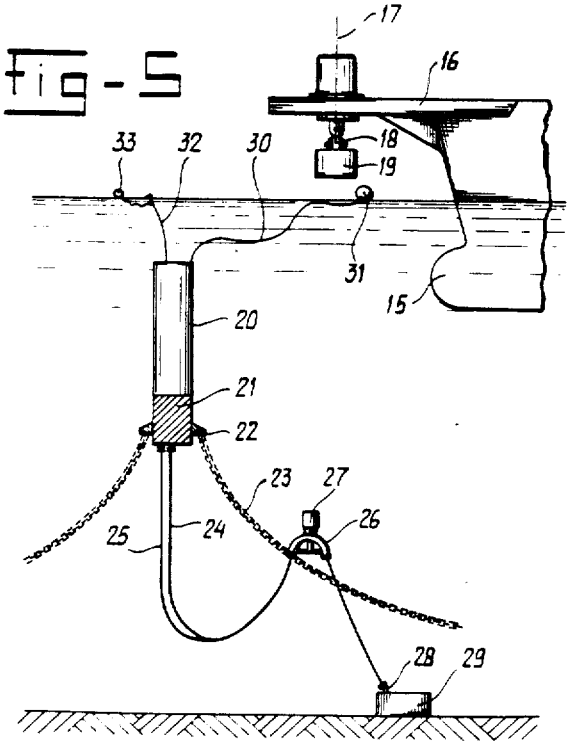

50
51
52
39
38
37
41
40
54
42
16
34
36
35
49
48
18
45
46
5
47
32
53
15
44
43
20

107
XIII
XIII
109
127
126
125
124
121
123
122
108
106
111
129
130
116
115
114

MOORING SYSTEM

Matter enclosed in heavy brackets [ ] appears in the original patent but forms no part of this reissue specification; matter printed in italics indicates the additions made by reissue.

The invention relates to a mooring system comprising a floating device having a storage capacity, such as a tanker, and a device, which is in relation to said tanker rotatable around a vertical axis and is connected to anchoring means, such as anchor chains, and supports a rotatable pipe line coupling for one or more pipe lines passing through said device.

Such a mooring system is for instance known from the British Pat. No. 1,115,155, and furthermore from the Dutch Patent Application No. 79.01416, which is laid open to public inspection. These known mooring systems have a permanent connection with the anchoring means. Said known systems offer the advantage, that because of the absence of a separate buoy, to which the tanker is attached by cables through a rigid arm, there are no floating bodies which are influencing each other. In heavy weather or under the influence of ice drift the anchoring through said arm, extending far in front, may cause troubles.

The same applies to mooring systems, in which the outwards extending arm, pivotable around a horizontal axis, is connected to the floating device or tanker, as is for instance known from the Dutch Patent Application No. 72.07903, which is laid open to public inspection and the report OTC 3567 "The Mooring of a Tanker to a Single Point Mooring by a Rigid Yoke", offered to the 11th annular OTC conference in Houston, Apr. 30–May 3, 1979, see especially FIGS 2 and 6.

An object of the invention is in the first place to improve these known mooring systems, such that the tanker can be separated from the anchoring means at any moment, or can be attached thereto very simply at any moment.

A further object of the invention is to provide a series of mooring systems based on the principle, so that it is possible to make a choice for very divergent possibilities and for very divergent conditions.

The object according to the invention is in the first place achieved, in that said anchor chain and said anchor chains and said pipe lines are connected to a buoyant body, which by means of a quick connect coupling can be attached to or released from said floating device.

Because of the application of a quick connect coupling between the buoyancy body, carrying the anchor chains and the pipe lines, and the floating system it is possible to make or release the connection very quickly. Because of the buoyancy capacity of the buoyancy body said body with its anchor means and the pipe lines remains within reach when said buoyancy body is not coupled. In the coupled situation the buoyancy capacity has no function. A tanker as for instance is known from the British Pat. No. 1,115,155 comprises at the bow an outwards extending arm, and it is thereby advantageous to be able to connect the buoyancy body to said arm by means of a quick connect coupling.

However, it is very well possible to install the quick connect coupling at a position between the bow and the stern of the ship to make a connection with means connected into or onto the ships hull in a way which can be compared with methods known for drilling ships, for instance known from the Dutch Patent Application No. 66.04865, which is laid open to public inspection and for which the Dutch Pat. No. 130,730 was granted. This greatly different approach makes it possible in heavy weather or in ice drift conditions to release the coupling with the anchor means and to make the tanker safe. The same is possible when repairs have to be carried out. After the return of the tanker the connection can be realized in a very simple and quick way by bringing the buoyancy body up and thereafter restoring the coupling.

Within the outline of this constructive approach various solutions are possible.

It is for instance possible to position said rotatable device on said buoyant body and to position the quick connect coupling in fact on that buoyancy body section, which can be fixedly connected to said floating device or to the arm of said floating device. All important components, such as the bearing between the rotatable sections and part of the quick connect coupling, are installed onboard the buoyancy body, which has the disadvantage that the bearing is in an increased way exposed to the influence of the sea water, however this has the advantage that the construction onboard of the tanker can remain very simple and this aspect deserves special attention when, according to a further development of the invention which will be described in detail hereafter, the buoyancy body is embodied as a completely equipped buoy having means for mooring any ship thereto. In that case it is necessary only to connect the floating device or the arm thereof to the turning table installed on said buoy. However, said buoy can also be used for fastening mooring chains of a ship which has no provisions for a quick connect coupling.

On the other hand it is possible to support the rotatable device in the tanker especially in bearings on the therefrom extending arm, whereby the quick connect coupling can be installed between the buoyancy body and said rotatable device, whereby said rotatable device carries the pipe line coupling. The vulnerable bearing and the vulnerable rotatable pipe line coupling are in that case positioned onboard of the tanker or similar floating device and are therefore better accessible for maintenance and repair operations and are only in a minor way exposed to the influence of sea water.

It is also possible to embody the whole configuration such that the buoyancy body is formed by said device which is rotatable in relation to the tanker, and which carries the pipe line coupling, whereby the quick connect coupling between said buoyancy body and the floating device or the therefrom extending arm is embodied such that a relative rotation between the tanker and the body is allowed. Said construction can be very simple as will be described in more detail.

If the rotatable device is positioned on said buoyancy body then, according to an embodiment of the invention, it is preferred to embody the rotatable section of said buoyancy body as a ring shaped buoyancy body. In that case the anchor chains are positioned inside the central section which is generally not rotating. Such an embodiment is in the decoupled condition very suitable to be used as an independent mooring buoy. In such an embodiment the coupling can be realized in that the ring-shaped buoyancy body comprises one or more recesses in its outer wall, destined to be engaged by horizontally displaceable locking means which are attached to the floating device or to the arm thereof and form together with said recess or recesses the quick connect coupling.

This recess configuration is also adaptable to the embodiment in which the rotatable part is installed on the floating device, especially installed on said extending arm, in which case said rotatable device comprises one or more horizontally displaceable locking means which, together with said recesses, form the quick connect coupling.

Said general principle can also be adapted to the configuration in which the relative rotation is not obtained by means of a bearing with a vertical rotational axis, but by means of an encircling groove in the outer wall of the buoyancy body, whereby the floating device or the therefrom extending arm has a crown of horizontally displaceable locking means which can be moved into and out of said groove, embodying together therewith said quick connect coupling and formed such that said locking means can move through said groove in the circumferential direction. Said locking means can have rotating parts cooperating with the walls of said groove, but they also can have lubricated sliding surfaces. In this way it is possible to eliminate the expensive bearing construction.

In all these embodiments it has advantages to embody the buoyancy body with a frusto-conical shape, cooperating with a corresponding conical surface of said floating device or the arm thereof. The conically-shaped parts can be fitted inside each other very easily.

When conically-shaped bodies with a circumferential groove, destined to be engaged by locking means, are used then these locking means are in general positioned at a larger diameter. This can have advantages for the strength of the coupling, it makes the whole construction however very bulky.

On the one hand, taking into account the applications to be expected, it may have advantages to use a buoyancy body in the system according to the invention, having large dimensions and functioning also as an independent buoy, on the other hand however the opposite approach may be preferred and one may have more need for a slender device, which eventually has the possibility to be submerged totally for instance under ice drift conditions, when large dimensions near the quick connect coupling are undesirable.

In that case the quick connect coupling can according to the invention comprise on the one hand a vertical pin attached to said floating device and having an inverted conical surface and on the other hand a crown of cams, which are movable around horizontal axes and can be engaged to said conical surface of said pin, which cams can be moved into their operating position and retained therein by means of wedges or a ring having a wedge-shaped cross section, of which the outer surfaces or surface can carry a support, eventually covered with friction material and having a self-braking friction angle, which wedge or wedges are coupled to hydraulic cylinders for moving said wedge or wedges into and out of the operating position. The space, occupied by such a coupling is relatively small although the dimensions are, as will become clear from the here-after-described examples, respectable.

This other coupling embodiment has also advantages when the buoyancy body is a mooring buoy, which is completely equipped with means for mooring a ship thereto, a possibility which applies in principle to all other embodiments and is only determined by considering if in a certain application such a large body, which in the decoupled situation behaves as and can be used as a mooring buoy, can be used or if another body is desired, which is slender and is therefore less influenced by waves.

It applies to all embodiments that the buoyancy body is, in the position in which the body is coupled to said floating device or to the arm thereof, elevated above the position in which said body would have only maximum buoyancy. In the coupled condition there is only one buoyancy body, i.e. the floating device because the buoyancy body is partly or as a whole elevated out of the water.

In the decoupled condition said buoyancy body floats on the water surface and according to the invention it may be preferred to install ballast tanks in said body for eliminating the buoyancy capacity at least partly. That offers the possibility to bring a part of the body underneath the water level or totally submerge said body, so that the body is not hindered by storms, ships, ice drift, and is ready for immediate use after the body is tracked down, for instance by means of a marker buoy and said body is brought up for instance by removing the ballast water using pressurized air.

Each time when the buoyancy body by means of the quick connect coupling should be connected to the floating device, it has to be elevated from the water and centered in the position within the coupling. Therefore said floating device comprises a hoisting device of which the hoisting means can carry out a hoisting operation in line with the vertical rotation axis of said rotatable device and furthermore said floating device has an opening through which the hoisting means can be guided during said aligning operation.

According to a further embodiment said buoyancy body comprises an elongated tube having a ballast space in the lower section thereof and having a part of the quick connect coupling positioned at the upper end, which tube is connected to said anchoring means. Such a slender embodiment is known in the form of a mooring buoy. In the mooring system according to the invention preferably ballast rooms are installed in the lower section because by ballasting it is possible to eliminate the buoyancy capacity and to get a unitary combination in the coupled condition without an interaction between two buoyancy bodies.

The anchoring means can consist of chains, attached somewhere to the tube, but preferably to the upper end thereof, but it is also possible to attach the lower end of said tube to a downwards inclined arm through a connection which is resistant to tensile strain and through a universal joint, whereby the other end of said arm is connected to the sea bottom by means of a horizontal pivot connection, whereby eventually a vertical pivot connection can be installed in the same place. If only a horizontal pivot connection is installed near the sea bottom very large forces act on the downwards inclined arm when the floating device or tanker is swaying, so that in that case it is certainly desirable to use chains together with this form of anchorage. The application of only a horizontal pivot connection near the sea bottom has the advantage, that the pipe line connections near the sea bottom can be very simple. That applies also to the case, in which a universal joint is installed near the sea bottom. However, if the whole configuration is able to sway around a vertical axis of rotation it is necessary to use complicated pipe line couplings which have to allow a rotation over 360° and which are difficult to reach when the sealing means thereof develop leaks.

If the buoyancy body is embodied as an elongated tube, then it is preferred, taking into account possible bending forces in said tube, to install a universal joint between the bearing of the rotatable device and the floating device, especially the arm thereof. Such a coupling can be positioned also at a lower level.

According to the invention a housing can be suspended from said universal joint by interposition of a bearing with a vertical shaft, which housing contains in his lower section a quick connect coupling and in the section between said bearing and said quick connect coupling said housing contains a rotatable pipe line coupling having a part which is fixed in relation to said housing and a rotatable part, inside which housing the connections to the input and output pipe lines are installed. Furthermore said housing offers the possibility to combine pipe lines used for the same medium and to install control means. In general control is carried out onboard of the tanker. Transferring control operations to this chamber inside said housing results in a great simplification, especially in relation to the pipe line coupling and the pipe lines running to the tanker.

FIGS. 4 and 5 illustrate schematically a possible embodiment in the coupled and in the uncoupled condition, respectively.

Figure 1:
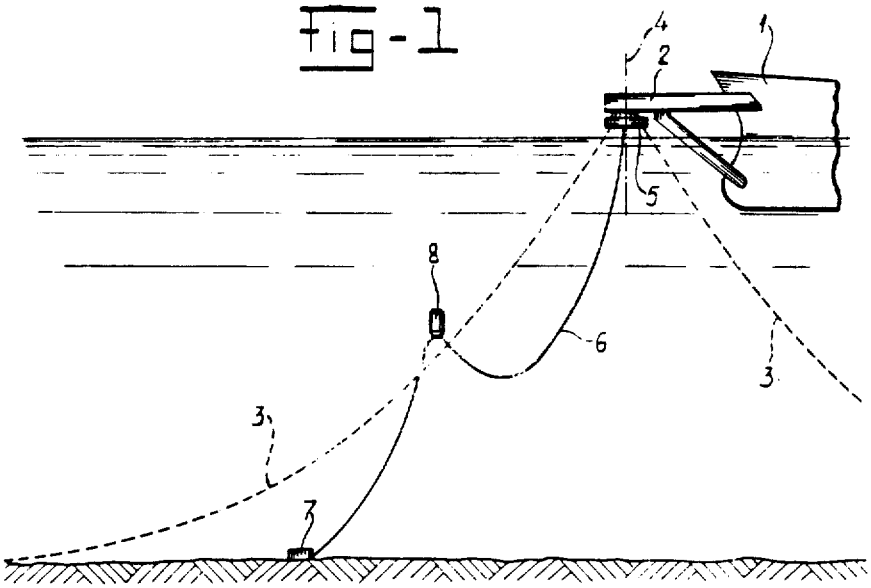
FIGS. 1 and 2 illustrates schematically a side view of a system according to the invention showing the basic principles.
Figure 2:
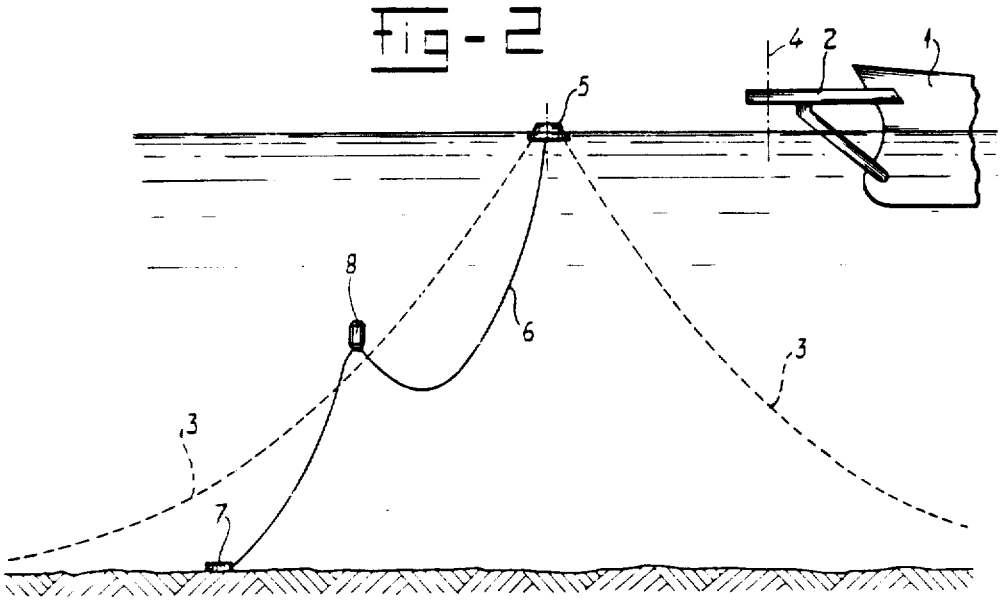

FIGS. 1 and 2 illustrate a tanker 1 carrying in a known way at the bow a stiff forward extending arm construction 2, attached to anchor cables 3 and swingable about a vertical axis of rotation 4. Whereas the coupling between the tanker and the anchor chains in the known mooring system is not releasable although a swinging movement of the tanker about the vertical axis 43 is allowed, in contradistinction thereto according to the invention a buoyancy body 5 is used to which the chains 3 are connected which body by means of a quick connect coupling, not illustrated in FIGS. 1 and 2 can be coupled to or uncoupled from said arm 2. Said body 5 supports the pipe lines 6, running to a point 7 on the sea bottom and eventually coupled to an auxiliary float 8.

Figure 3:
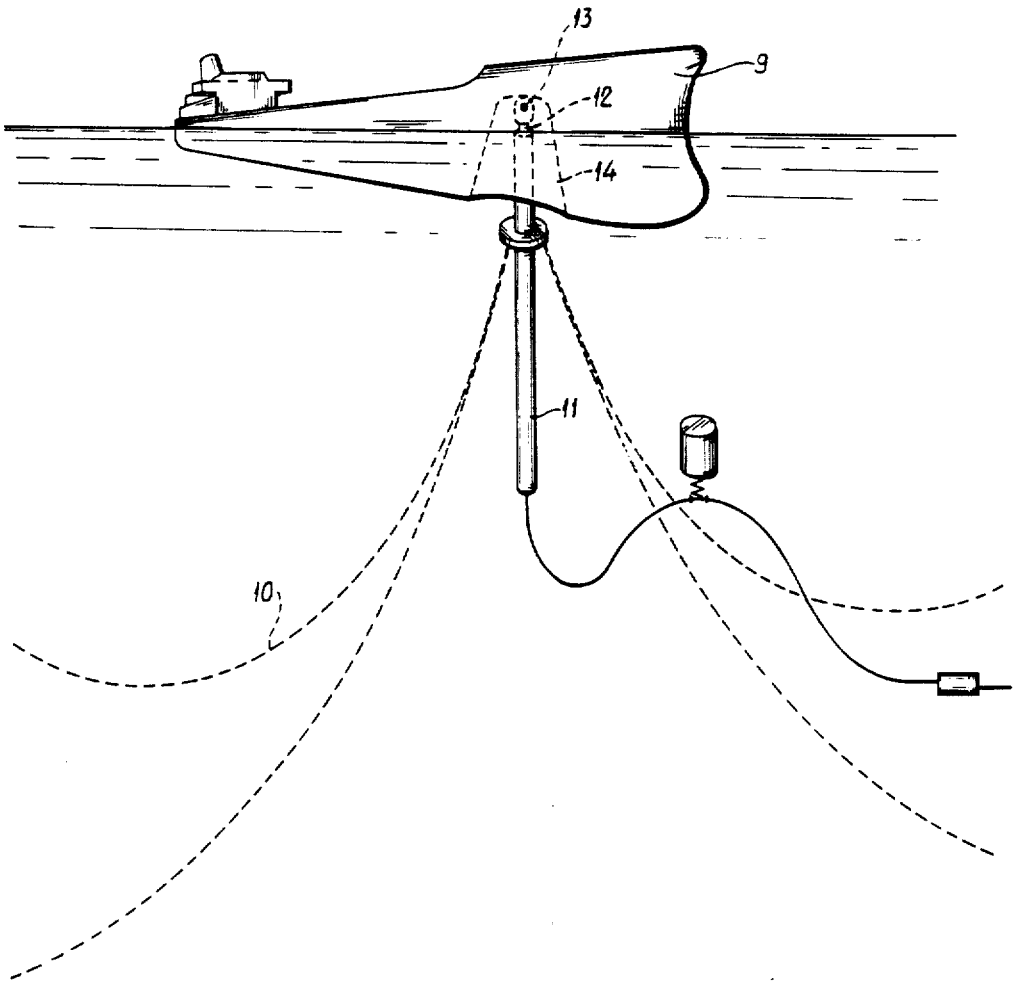
FIG. 3 illustrates another embodiment of the system, with the coupling at another position.

FIG. 3 shows that the connection between the buoyant body and the tanker also can be realized at another position. FIG. 3 illustrates a tanker 9, attached to mooring chains 10 through an interposed elongated body 11, the upper end of which carries at 12 a not in detail illustrated quick connect coupling 12, above which the univeral joint 13 (also not shown in detail) is installed. The upper end of said body 1, the quick connect coupling 11 and the joint 13 are received in the hollow space 14 of a tanker, which means they are partly above the water level and in a protected environment.

FIGS. 4 and 5 illustrate a tanker 15 carrying an arm 16 in front. A body 19 is suspended from said arm rotatable about a vertical shaft 17 and attached through a universal joint 18, which body by means of a not illustrated quick connect coupling can be coupled to the upper end of a cylindrical body 20, comprising ballast spaces 21 for controlling the buoyancy of said body and furthermore chain stoppers to which the anchor chains 23 are connected. From said body 20 the hoses 24 and 25 are supported which, through a curved piece 26, suspended from an auxiliary float 27, are connected to pipe lines 28 which run to a bottom anchor 29.

FIG. 4 shows the whole construction in the coupled position and FIG. 5 shows the uncoupled condition, in which the body 20 is furthermore lowered beneath the water level. To be able to locate this body 20 a buoy 31 is coupled thereto through a cable 30, and furthermore a hose 32 is present, also coupled to a buoy 33 by means of which pressurized air can be supplied to the ballast spaces 21 to remove the water ballast therefrom and to bring the upper end of the body 20 above the water level to be able to couple this upper end to the body 19.

Figure 6:
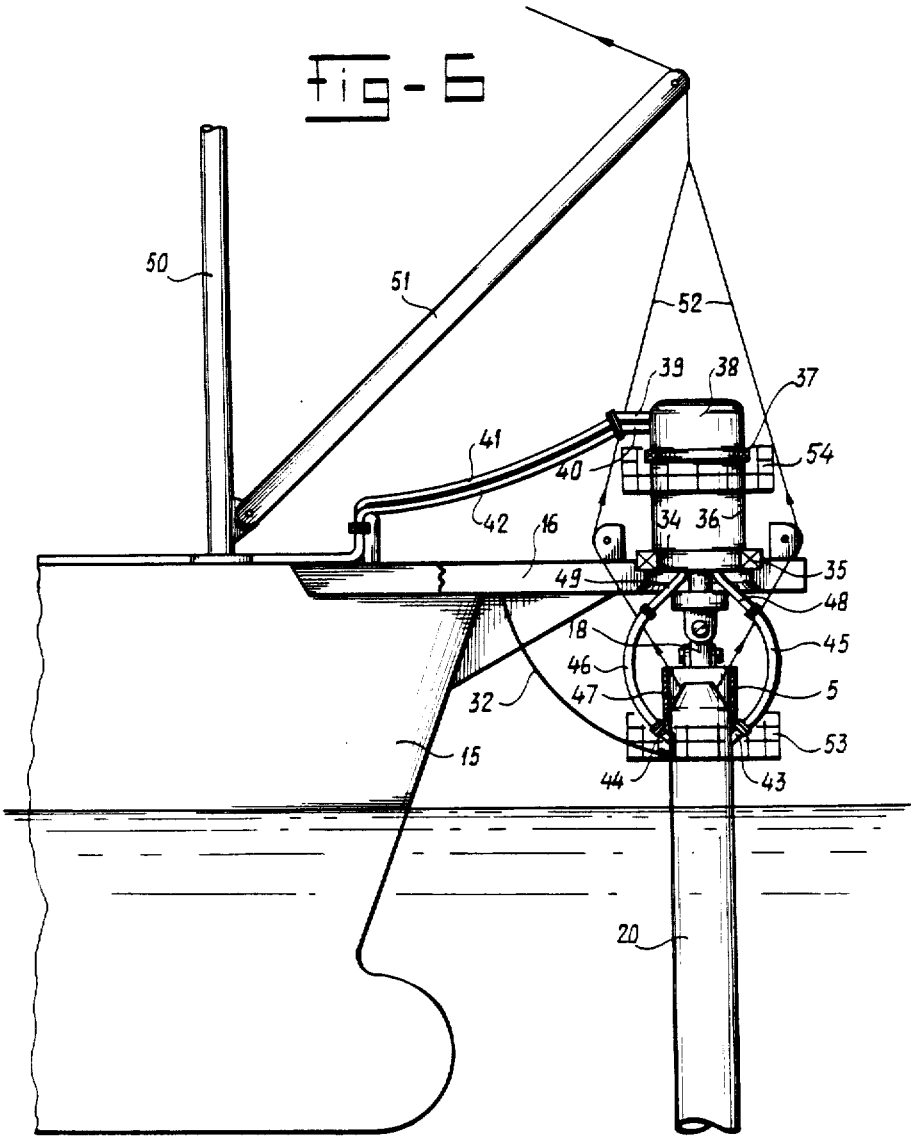
FIG. 6 illustrates the embodiment of FIGS. 4 and 5 on an enlarged scale.

FIG. 6 illustrates the connection of FIGS. 4 and 5 on an enlarged scale. FIG. 6 illustrates again the tanker 15 having the arm 16, to which the anchored buoyancy body 20 is connected through the universal joint 18, which joint itself is connected to the ring 34 of a roller bearing 35 supported onto the arm 16.

A housing 36 is positioned on said inner ring 34 and said housing supports, rotatably through a roller bearing 37, the rotatable part of the pipe line coupling 38 from which the conduits 39, 40 are connected through the hoses 41, 42 to the tanker pipe lines.

The pipe lines running through the body 20 extend outwards at the upper end near 43, 44 and can have quick connect couplings for the hoses 45, 46.

Said hoses bypass the quick connect coupling, in general indicated by 47, as well as the universal joint 18. Said hoses 45, 46 are connected to the pipe lines 48, 49 running through the bearing 35 to the stationary part 36 of the rotatable pipe line coupling 38.

A hoisting system is indicated by 50, 51 and the cables 52 thereof are connected to the body 20 to elevate said body to be able to make the connection with the quick connect coupling 47.

At 53 and 54 platforms can be installed for personnel to carry out operational or maintenance procedures.

Figure 7:
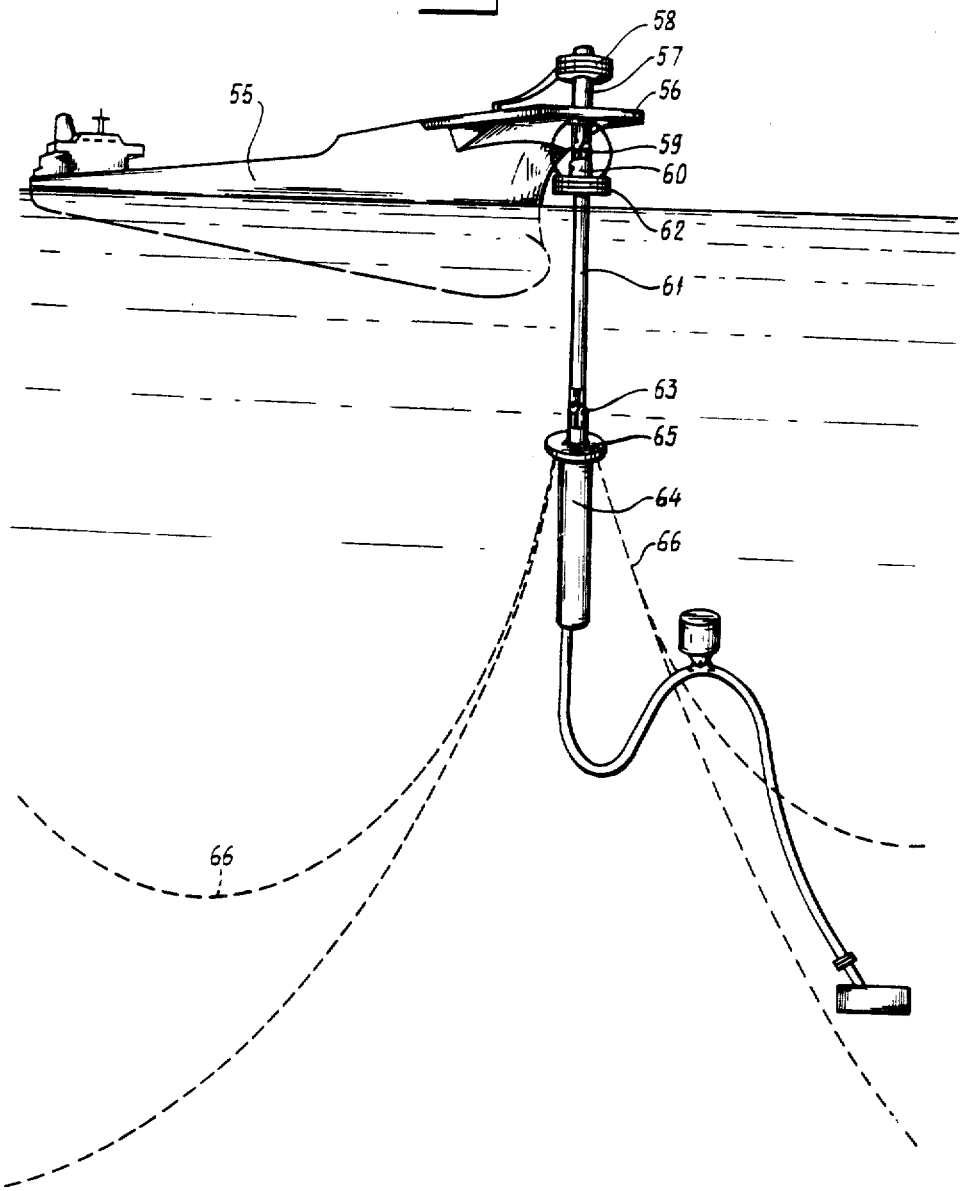
FIG. 7 shows another embodiment.

FIG. 7 illustrates an embodiment comprising a tanker 55 with an arm 56 supporting a rotatable pipe line coupling 57, 58 and having parts 60, 61 suspended therefrom through a universal joint 59, which parts are through the quick connect coupling 62 attached to each other.

In this embodiment the buoyancy body 61 is embodied as an elongated tubular body, the lower end of which is through a universal joint 63 coupled to a cylindrical body 64 with air or ballast spaces, the upper end of which carries a chain table 65 for connecting the anchor chains 66.

Figure 8:
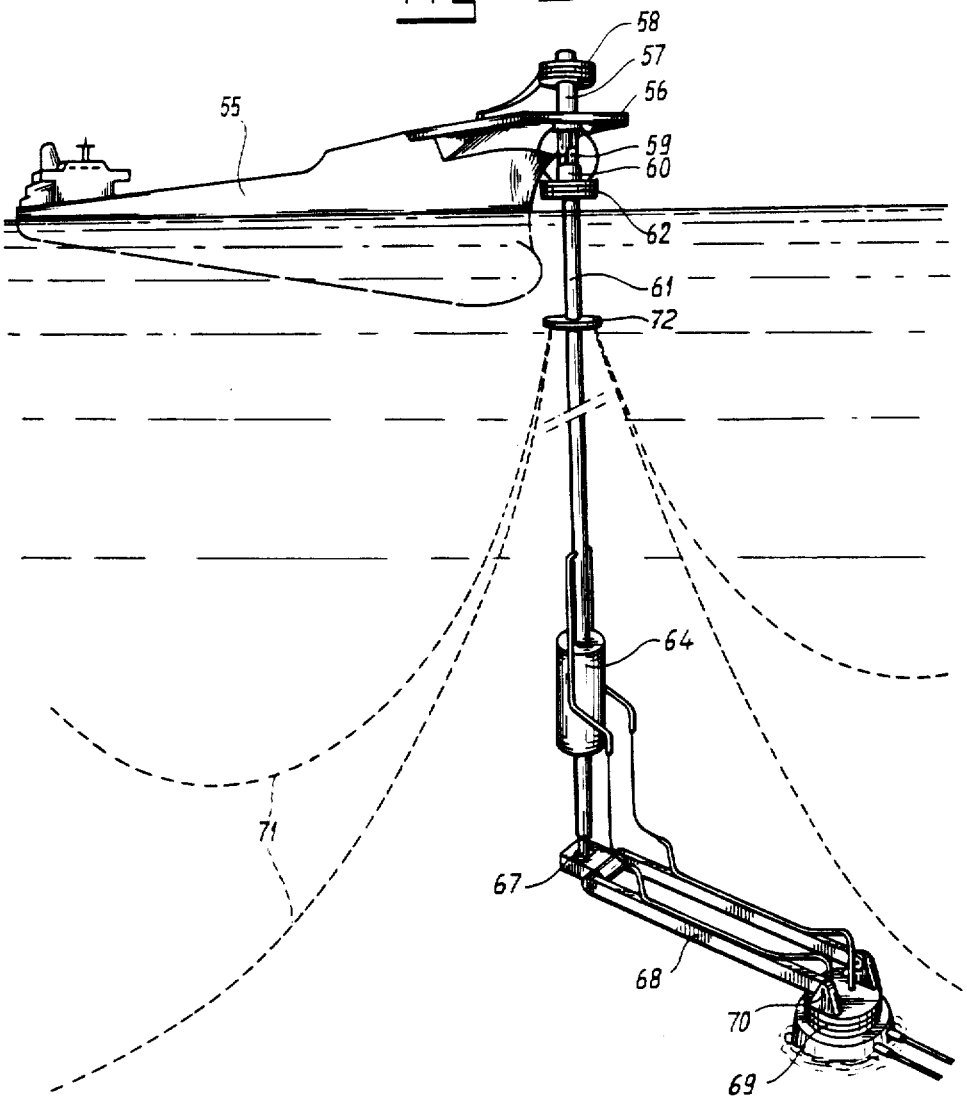
FIG. 8 shows a further embodiment.

FIG. 8 illustrates an embodiment of which the upper section above the water level is indicated by the same reference numbers as FIG. 7 and corresponds therewith.

Also in this embodiment the quick connect coupling 62 carries a tubular body 61 with a ballast chamber 64 in the lower section thereof. Instead of the tubular body 61 it is also possible to use a body with one or more universal joints or even a simple chain. The cylindrical buoyancy body 64 uses its buoyancy capacity only when a coupling has to be made. In the coupled condition the body is completely ballasted to deliver by its weight the force necessary for keeping the tanker 55 in place.

The body is anchored in this configuration through a universal joint at the lower end 67 coupled to an arm 68 which is through a horizontal pivot joint 70 connected to a bottom anchor 69. In this embodiment the arm 68 can swing around only said horizontal pivot shaft 70. To prevent overloading of this construction it is useful to install anchor chains 71 which for instance at 72 are connected to a higher level section of the configuration.

It is possible to use instead thereof a universal joint having a horizontal axis as well as an axis in the vertical plane, so that the arm 68 has a restricted swinging capacity, which in combination with the anchor chains 71 results in a very efficient construction. The rotatable multiple pipe line coupling in the bottom anchor can be eliminated in that case, and furthermore overloading of the arm 68 by forces acting sidewards thereon is prevented.

However, it is also possible to use a vertical rotation axis at the location of the bottom anchor 69, so that the arm 68 has the possibility to swing through 360°, however in that case a multiple pipe line coupling is necessary in said bottom anchor 69 allowing such a swinging movement.

Figure 9:
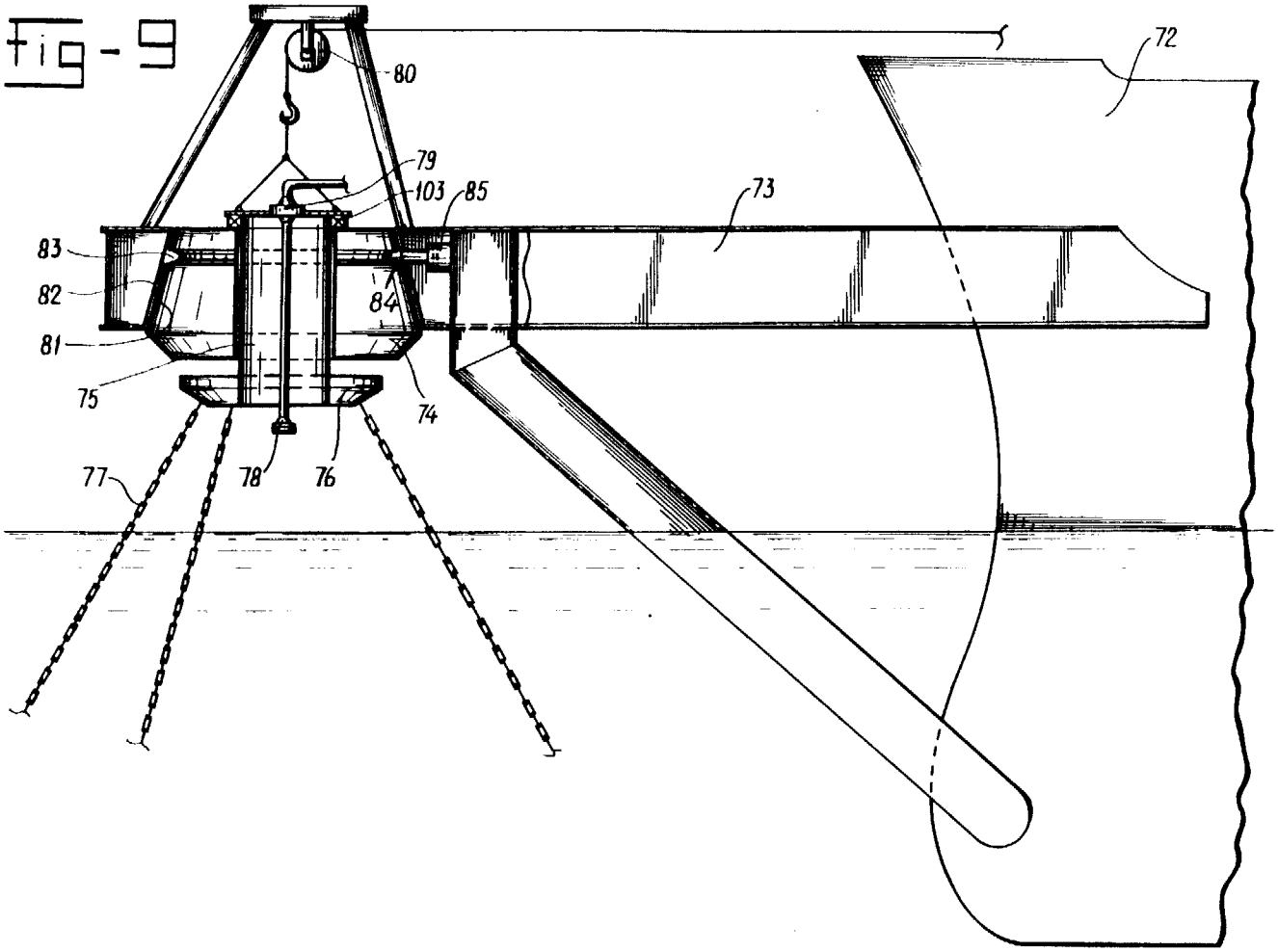
FIG. 9 shows an embodiment of the buoyancy body.

FIG. 9 illustrates a tanker 72 with a thereto connected arm 73.

The buoyancy body comprises a ring shaped buoy 74, rotatable about a core 75, carrying the chain table 76 to which the anchor chains 77 are connected and which supports the pipe lines 78, at the upper end of which core a rotatable pipe line coupling 79 is installed.

A hoisting block is indicated by 80.

The outer wall of the ring shaped buoy body 74 is, as is indicated at 81, embodied with a conical shape and the arm 73 has a thereto correspondingly formed opening 82. By means of said hoisting block 80 the buoy 74 can be elevated out of the water and pulled against the arm 73.

The ring shaped buoy body has at the conically shaped outer wall 81 an encircling recess 83 and at various places around said opening 82 horizontally movable locking pins 84 are installed, which pins can be operated by means of a cylinder 85. The outer ends of said pins are formed such that they are able to clamp into said groove 83. Said encircling groove 83 has the advantage, that it is not necessary to align said pins with grooves before the coupling procedure. It is sufficient to draw the buoy shaped body 74 against the arm and thereafter move said pins inwards.

Figure 10:
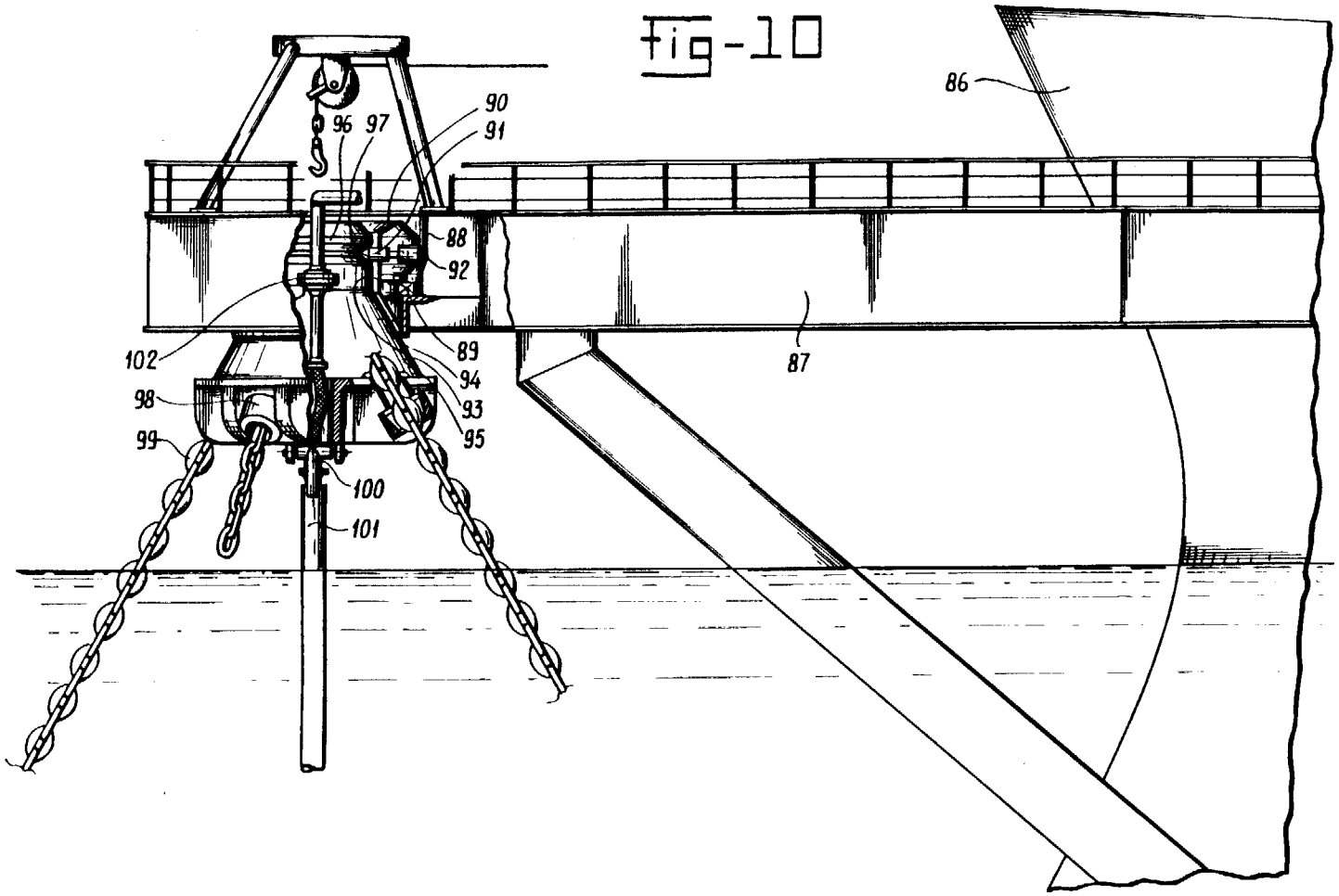
FIG. 10 shows a variant thereof.

FIG. 10 illustrates a tanker 86 with an arm 87, the end of which comprises an opening 88 in which a ring shaped body 90 is rotatably supported through a roller bearing 89, which body 90 carries the locking means 91 and the operating cylinders 92 and has furthermore a partly cylindrically and partly conically shaped inner surface 93, 94.

The buoyancy body comprises a barrel 95 having in general a conically shaped outer surface of which the top section at 96 is cylindrically shaped and comprises an encircling recess 97, which in the same way as described in relation to FIG. 9 cooperates with the locking pins 91.

The barrel 95 comprises chain stoppers 98 for the anchor chains 99. A universal joint 100 is attached to the under side of the barrel 95 and from said joint a pipe line 101 extends downwards, which pipe line either through universal joints and flexible pipe line couplings can be connected to a pipe line ending at the position of the bottom anchor, or can have in another way a connection with pipe lines, for instance through long hoses.

Inside the barrel body a further rotatable pipe line coupling 102 is installed.

In the illustrated coupled condition the whole configuration of tanker 86 and arm 87 and the anchored barrel 95 is rotatable by means of the bearing 89.

In the embodiment of FIG. 9 this rotatable feature is realized by means of the bearing between the ring 74 and the core 75, which bearings are for instance installed at 103.

If the bearings 103 and 89 are eliminated in the embodiments of FIGS. 9 and 10 respectively, then the implication thereof is that in the arm a number of horizontally displaceable locking means are installed and that said buoyancy body, which is fixedly connected to the anchor chain and is therefore not rotatable in relation to said chain, has a ring-shaped groove.

If the end section of said locking means are embodied such that they do not clampingly engage said groove, but are received movably inside said groove, then there is in principle the possibility of rotating said configuration by sliding or rolling the ends of said locking means over the surface of said groove.

Especially the embodiment of FIG. 9 is suited to be used as a normal mooring buoy in the uncoupled condition. A mooring buoy of this type, comprising means for connecting the anchor lines of a ship and floating hoses, is known. The buoy 74, illustrated in FIG. 9, differs from said prior art buoy only by the presence of the groove 83 belonging to the quick connect coupling.

It is not only possible to adapt an existing buoy very easily to be used in the combination with an arm-carrying tanker as is illustrated in FIG. 9, but one has also the advantage, that in the uncoupled condition and preferably in the absence of a tanker, each other ship can be moored very easily to this buoy, whether because one has to use temporarily a tanker not comprising a supporting arm construction, or one has to moor ships which are necessary for maintenance and repair operations.

Figure 11:
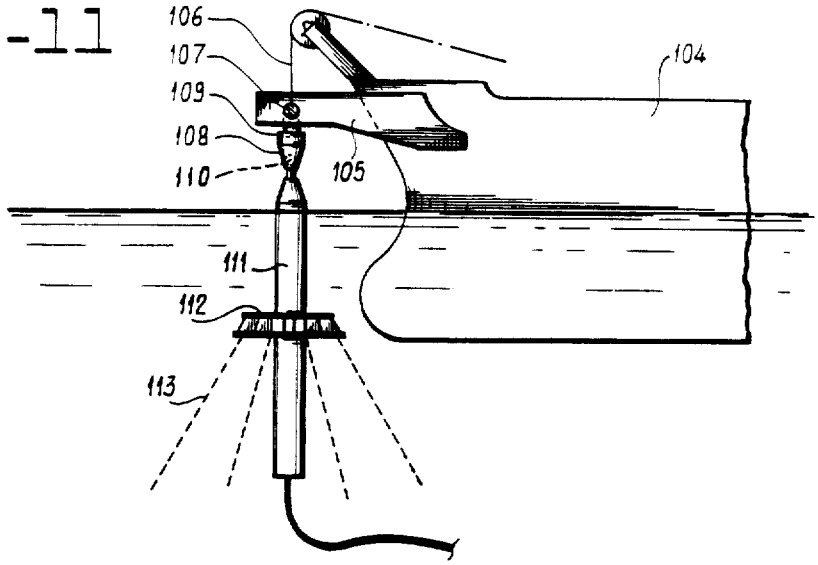
FIGS. 11 and 12 show a further embodiment in the coupled and uncoupled condition, respectively.
Figure 12:
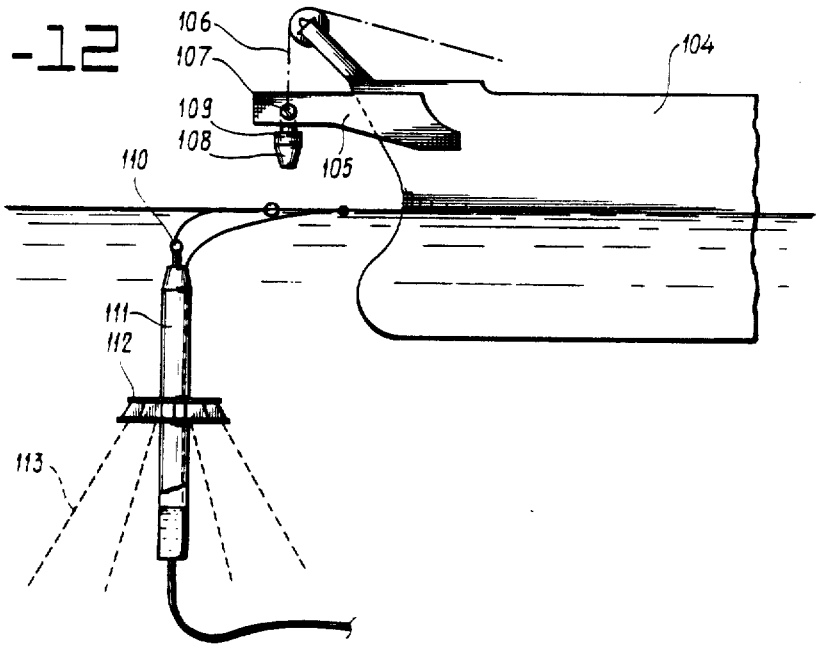

FIGS. 11 and 12 illustrate a tanker 104 with an arm 105 and said arm carries an aligned configuration of a hoisting cable 106, a universal joint 107 and a housing 108, which housing by means of a ring shaped bearing 109 is attached to said joint.

The quick connect coupling for coupling the buoyancy body 111 is indicated by 110, and said buoyancy body has a chain table 112 to connect the anchoring chains 113, whereby this configuration is further similar to that shown in FIGS. 7 and 8.

In the uncoupled condition the configuration may be completely submerged as is shown in FIG. 5 and is, for this embodiment, shown in FIG. 12.

Figures 13, 14:
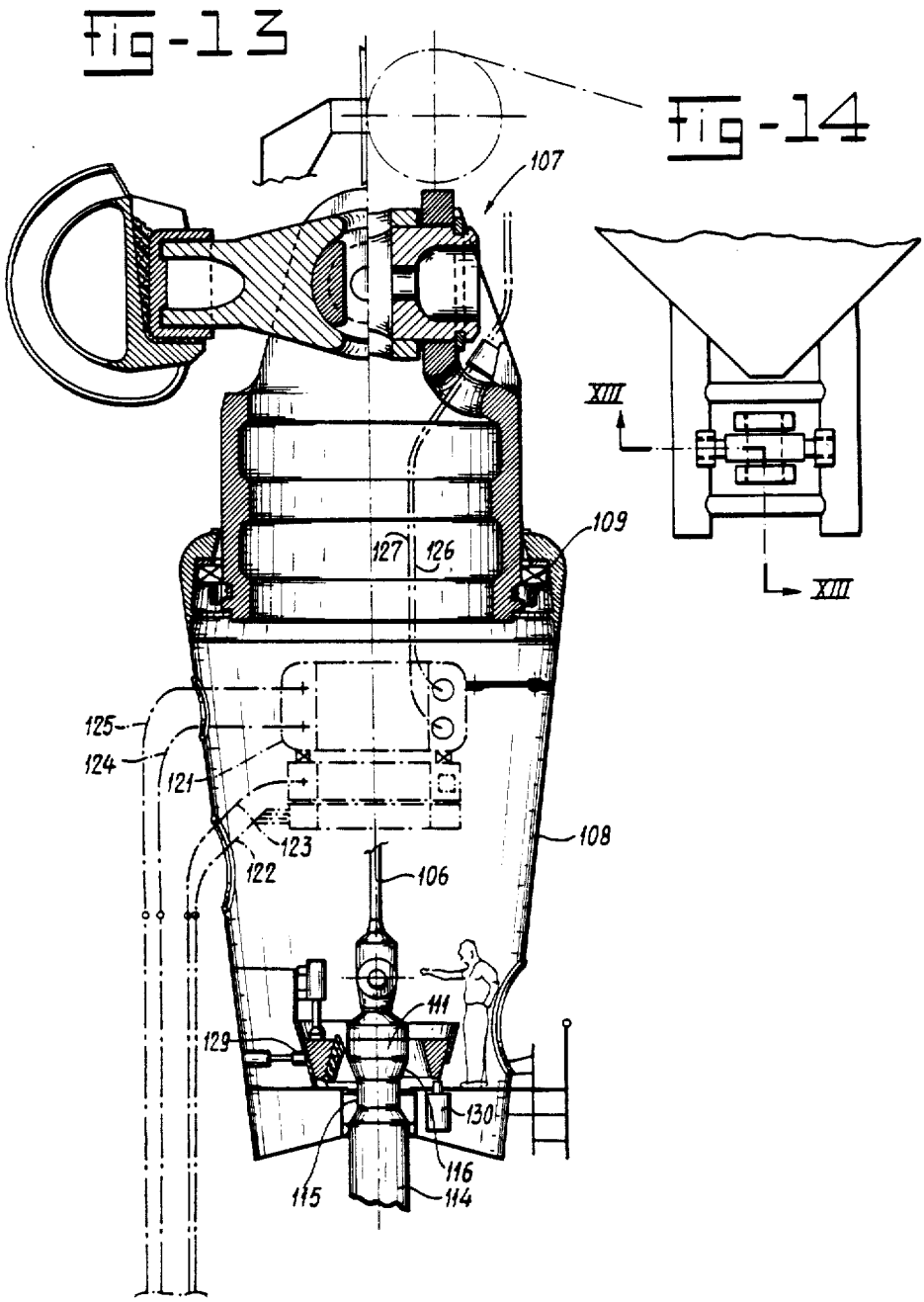
FIG. 13 shows a part therefrom on an enlarged scale in section according to the line XIII—XIII of FIG. 14.
FIG. 14 is a top plan view of FIG. 12.

FIG. 13 illustrates on an enlarged scale a housing 108 suspended through a main bearing 109 from a universal joint 107.

The quick connect coupling is installed in the lower section of said housing 108 and comprises at the side of the buoyancy body 111 a pin 114 having a contracted section 115 with an inverted conical surface 116. The whole configuration can be suspended from the hoisting cable 106.

Figure 15:
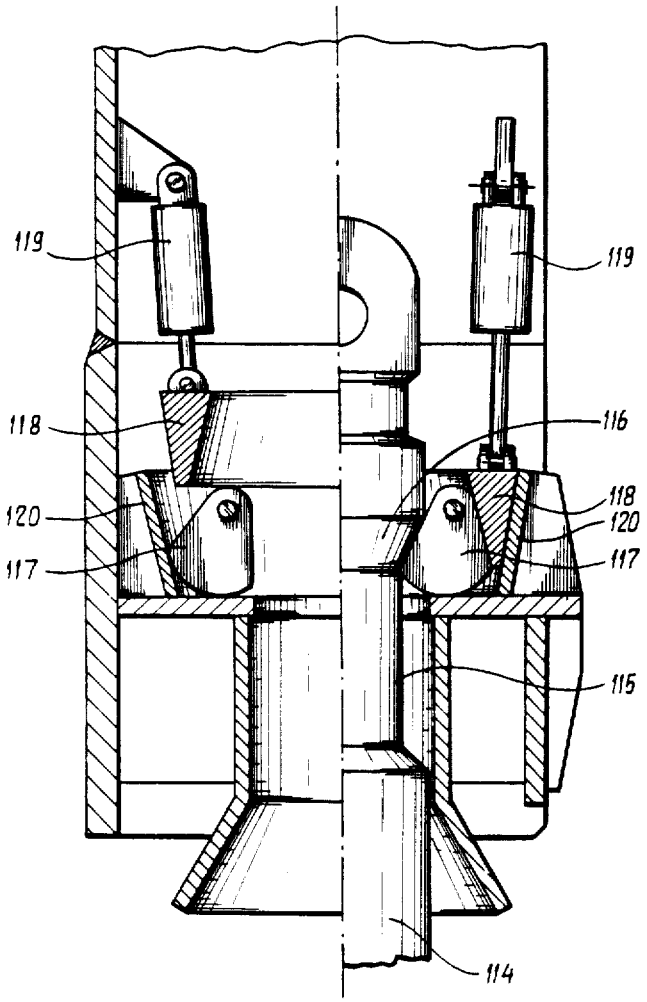
FIG. 15 illustrates on an enlarged scale the quick connect coupling of FIG. 13.

As is shown in FIG. 15 the quick connect coupling has a number of cams 117 which by means of wedges 118, for instance in the form of a wedge-shaped ring, can be swung into the operating position which is illustrated in the right hand section of FIG. 15, or can be moved back into the non-activated position illustrated in the left hand figure part, as soon as the wedges 118 are moved upwards.

The wedges are operated by means of cylinders 119 and are supported at the outside on a ring-shaped conical surface 120, which is embodied with a self-braking capacity, so that the force components acting in a transverse direction do not result in an upwards movement of the wedges 118.

FIG. 14 illustrates only how the cross section through the universal joint of FIG. 13 is taken and illustrates that the cable 106 is able to move through the center of this kind of joint.

A rotatable pipe line coupling 121 of known type having a fixed inner ring and in relation thereto rotatable outer rings are installed inside the housing 108.

The upwards extending pipe lines are through hoses 122, 123, 124, 125 connected to the pipe line coupling 121, which hoses extend through openings in the housing wall, and from said pipe line coupling hoses 126, 127 even along the universal joint upwards and through the stiff arm 105 to the tanker.

The reference number 129 in FIG. 13 indicates a horizontally displaceable locking pawl by means of which the wedges can be retained in their operating position even when the self-braking action of the supporting surface is not sufficiently reliable. The number 130 indicates an auxiliary. cylinder of which a number can be installed and these cylinders back the return movement of the wedges.

A person is illustrated in the housing 108 to indicate the dimensions of such a housing. It wil be clear that the various pipe lines, ending in said housing or starting therefrom, may have valves which can be operated from inside this housing and it is furthermore possible to install control means in said housing for controlling the well.

Figure 16:
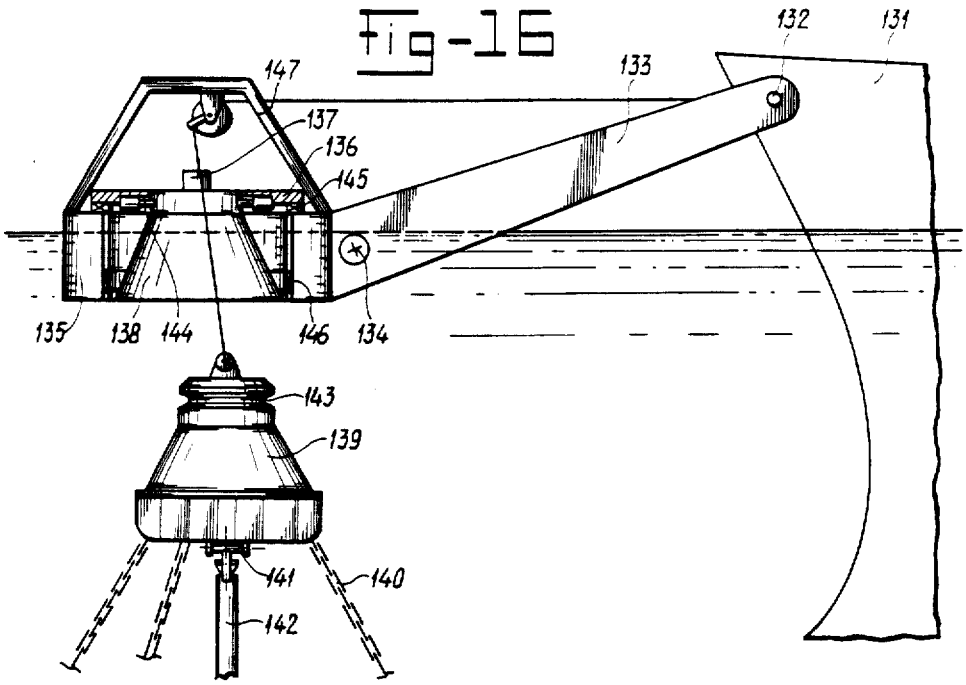
FIG. 16 illustrates an application of the invention on a tanker having an arm, which is swingable about a horizontal axis, and a buoy, wherein the principles of FIG. 10 are used.

FIG. 16 illustrates an embodiment with a tanker 131 to which an arm 133 is attached by means of a horizontal pivot connection 132, whereby the end of said arm, eventually with an interposed horizontal pivot connection 134 is connected to the buoy 135. Said buoy carries a turntable 136, on which the rotatable pipe line coupling, schematically indicated by 137 is installed.

Said turntable has a central opening 138 and a second buoy 139 with controllable buoying capacity fits into said opening, whereby anchor chains 140, a universal joint 141 and the pipe line 142 are attached to said second buoy. The buoy 139 has a conical outer surface fitting into the opening 138.

The upper end of said buoy comprises a groove 143 adapted to be engaged by locking means 144.

The turntable is rotatable in said buoy 135 and is supported by means of roller bearings 145 and 146.

A derrick 147 is installed on said buoy 135 for handling the second buoy 139.

Figure 17:
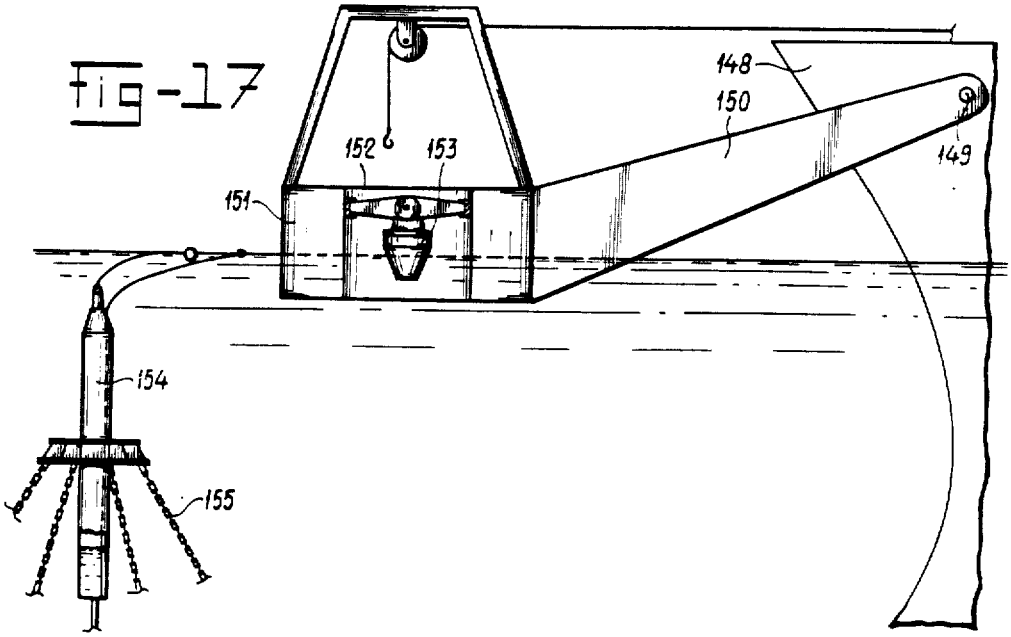
FIG. 17 is a view similar to FIG. 16 showing another embodiment of the invention.

FIG. 17 illustrates a tanker 148 with an arm 150 connected thereto, by means of the pivot shaft 149, and arm 150 carries at the other end the buoy 151.

Said buoy has a central recess 152, in which the housing 153 is suspended, which housing is of the type illustrated in FIG. 13. A buoyancy body 154 of the type illustrated in FIGS. 11 and 12 can be coupled with said housing 153 and said buoyancy body carries anchor chains 155.

We claim:

1. In a mooring system comprising a floating device having storage capacity such as a tanker, chains for anchoring the tanker, said chains being connected to a body which is rotatable about a vertical axis on an arm attached to the tanker and through which body conduits extend from the sea bottom towards the tanker; the improvement in which said arm is rigidly attached to the tanker and said body comprises a buoy having its own buoyancy, which buoy can be connected to or disconnected from the arm, said buoy carrying said conduits which conduits are provided with quick couplings, the buoy being of substantially conical shape and having a circimferentially extending groove for the engagement of a quick connecting coupling comprising releasable locking means carried by said arm, said buoy with its conical outer face fitting into a corresponding recess of the arm and being held up out of the water by the arm when coupled to the arm and floating on the water surface when uncoupled from the arm.

2. In a mooring system comprising a floating device having storage capacity such as a tanker, chains for anchoring the tanker, said chains being connected to a body which is rotatable about a vertical axis on an arm attached to the tanker and through which body conduits extend from the sea bottom towards the tanker; the improvement in which said body comprises a buoy having its own buoyancy, which buoy can be connected to or disconnected from the arm, said buoy carrying the conduits which conduits are provided with quick couplings, the buoy being of substantially conical shape and having a circumferentially extending groove for the engagement of a quick connecting coupling comprising releasable locking means carried by said arm, said buoy with its conical outer face fitting into a corresponding recess of the arm, the buoy comprising a cylindrical sleeve with buoyancy and a vertical axis, which sleeve at its upper end has a part of said quick connecting coupling.

3. Mooring system according to claim 2, in which the part of the quick connecting coupling attached to the arm is attached thereto by a cardan joint.

4. In a mooring system comprising a floating device having storage capacity such as a tanker, chains for anchoring the tanker, said chains being connected to a body which is rotatable about a vertical axis on an arm attached to the tanker and through which body conduits extend from the sea bottom towards the tanker; the improvement in which said body comprises a buoy having its own buoyancy, which buoy can be connected to or disconnected from the arm, said buoy carrying the conduits which conduits are provided with quick couplings, the buoy being of substantially conical shape and having a circumferentially extending groove for the engagement of a quick connecting coupling comprising releasable locking means carried by said arm, said buoy with its conical outer face fitting into a corresponding recess of the arm, the quick connecting coupling comprising on the one hand a vertical pin, attached to said buoy and having an inverted conical surface and on the other hand a crown of cams which are movable around horizontal axes and can be engaged with said conical surface of said pin, which cams can be moved into their operating position and retained therein by wedge means of which the outer surface carries a support covered with friction material and having a self-braking friction angle, which wedge means are coupled to hydraulic cylinders for moving said wedge means in and out of their operating position.

5. Mooring system according to claim 4, and a housing suspended from a universal joint by a bearing with a vertical shaft, which housing contains in its lower section said quick connecting coupling and in the section between said bearing and said quick connecting coupling said housing contains a rotatable pipe line coupling having a part which is fixed in relation to said housing and a rotatable part in which connections to input and output pipe lines are installed.

6. Mooring system according to claim 5, in which the input pipe lines into said housing and the output pipe lines from said housing are combined into at least one collecting pipe line.

7. Mooring system according to claim 5, and controlling means for controlling the flow in said pipe lines positioned inside said housing.

*8. In a mooring system comprising a floating device having storage capacity such as a tanker, chains for anchoring the tanker, said chains being connected to a body which is rotatable about a vertical axis on an arm attached to the tanker and through which body conduits extend from the sea bottom towards the tanker; the improvement in which said arm is rigidly attached to the tanker and said body comprises a buoy having its own buoyancy, which buoy by means of a quick connecting coupling can be connected to or disconnected from the arm, said buoy carrying the conduits which conduits are provided with quick couplings as well, said buoy being held up out of the water by the arm when coupled to the arm and floating on the water surface when uncoupled from the arm.*

*9. Mooring system according to claim 8, in which the buoy is of substantially conical shape and has a circumferentially extending groove for the engagement of locking means, said buoy with its conical outer face fitting into a corresponding recess of the arm.*

*10. Mooring system according to claim 8, in which the body is a mooring buoy having means for mooring a ship thereto.*

*11. In a mooring system comprising a floating device having storage capacity such as a tanker, chains for anchoring the tanker, said chains being connected to a body which is rotatable about a vertical axis on an arm attached to the tanker and through which body conduits extend from the sea bottom towards the tanker; the improvement in which said body comprises a buoy having its own buoyancy, which buoy by means of a quick connecting coupling can be connected to or disconnected from the arm, said buoy carrying the conduits which conduits are provided with quick couplings as well, the buoy comprising a cylindrical sleeve with buoyancy and a vertical axis, which sleeve at its upper end has said quick connecting coupling.*

*12. Mooring system according to claim 11, in which the part of the quick connecting coupling attached to the arm is attached thereto by a cardan joint.*

*13. Mooring system according to claim 11, in which the quick connecting coupling comprises on the one hand a vertical pin, attached to said floating device and having an inverted conical surface and on the other hand a crown of cams which are movable around horizontal axes and can be engaged with said conical surface of said pin, which cams can be moved into their operating position and retained therein by wedge means of which the outer surface carries a support covered with friction material and having a self-braking friction angle, which wedge means are coupled to hydraulic cylinders for moving said wedge means in and out of their operating position.*

*14. Mooring system according to claim 13, and a housing suspended from said universal joint by a bearing with a vertical shaft, which housing contains in its lower section a quick connect coupling and in the section between said bearing and said quick connect coupling said housing contains a rotatable pipe line coupling having a part which is fixed in relation to said housing and a rotatable part in which connections to input and output pipe lines are installed.*

*15. Mooring system according to claim 14, in which the input pipe lines into said housing and the output pipe lines from said housing are combined into at least one collecting pipe line.*

*16. Mooring system according to claim 14, and controlling means for controlling the flow in said pipe lines positioned inside said housing.*

* * * * *